United States Patent [19]

Stumpp

[11] 4,084,917
[45] Apr. 18, 1978

[54] TURNING TOOL, ESPECIALLY FOR COPYING TURNING

[75] Inventor: Bernard Stumpp, Friedrichshafen, Germany

[73] Assignee: Zahnradfabrik Friedrichshafen AG, Friedrichshafen, Germany

[21] Appl. No.: 740,757

[22] Filed: Nov. 10, 1976

[51] Int. Cl.² .............................................. B26D 1/00
[52] U.S. Cl. ................................................... 407/114
[58] Field of Search .......................... 29/96, 95, 105 R

[56] References Cited

U.S. PATENT DOCUMENTS

| 2,176,265 | 10/1939 | Luers | 29/95 R |
| 3,812,547 | 5/1974 | Reich | 29/96 |
| 3,813,748 | 6/1974 | Lindemann | 29/105 R |
| 3,848,303 | 11/1974 | Faber | 29/96 |

FOREIGN PATENT DOCUMENTS

| 951,624 | 3/1964 | United Kingdom | 29/96 |

Primary Examiner—Leonidas Vlachos
Attorney, Agent, or Firm—Karl F. Ross

[57] ABSTRACT

A turning tool for the turning of workpieces, especially in automatic copying machines, comprises a turning plate which can be composed of hard metal, e.g. tungsten carbide, and is adapted to carry out both longitudinal turning and transverse turning, e.g. facing of the workpiece. The turning plate, which can be mounted upon the usual holder of a lathe of the copying type, has a pair of adjoining cutting edges inclined to one another and including a main cutting edge and an auxiliary cutting edge designed to produce a chip having two distinct adjoining portions so that, upon curling of the chip, it tends to break at a maximum length of, say, 5 to 6 cm.

5 Claims, 4 Drawing Figures

TURNING TOOL, ESPECIALLY FOR COPYING TURNING

FIELD OF THE INVENTION

The present invention relates to turning plates adapted to be used in turning processes of all types and, more particularly, to a turning tool for lathes and especially copying lathes.

BACKGROUND OF THE INVENTION

In the lathe turning of a workpiece, the turning operation can comprise a longitudinal turning in which the tool is moved along an axis of rotation of the workpiece as well as transverse turning, e.g. facing, in which the tool is moved transverse to this axis. In copying lathes, the turning process can include a combination of longitudinal and transverse turning with portions of the process involving exclusively longitudinal turning while other portions involve exclusively transverse turning or facing.

In the turning of metal workpieces, especially with copying lathes, problems have arisen with respect to the length of the chip which is removed from the workpiece. It is not uncommon, for example, for a relatively long curled chip having a length of tens of centimeters to be produced during the turning process. Chip lengths of this magnitude are detrimental since the long curled chip, having the configuration of a helix or spiral, tends to create dangers with respect to operating personnel, can wind around parts of the workpiece and can result in shattering, vibration or the like during the cutting operation. The latter disadvantage reduces the machining accuracy and reproducibility of the parts which are to be formed on the copying lathe.

The cutting tool can comprise a so-called turning plate of a hard metal, e.g. tungsten carbide, which can be mounted on a holder, e.g. by bonding the turning plate as a tip of tungsten carbide on a conventional tool bit.

The problem with excessively long chips has confronted the art for considerable time and many effeorts have been made to develop turning tools with a controlled chip breakage, i.e. a breakage after the chip is formed and before it has exceeded a certain maximum length. These systems have been proposed primarily for longitudinal turning, i.e. the turning of long shafts, rods or bars by movement of the tool parallel to the axis of rotation of the workpiece while the same is rotated about its axis. While such systems are effective to obtain a controlled chip breakage for longitudinal turning, when the same turning plates are employed for facing, i.e. transverse turning, they produce relatively wide, thin and excessively long chips, so-called irregular chips, which are detrimental to the operations which are desired for the reasons enumerated above. The problem is especially pronounced in copying lathes or, more generally, copier turning apparatuses in which a combined longitudinal and face turning is carried out. It is necessary in such cases to remove the long irregular chips by means of chip hooks or the like and hence to constantly monitor the turning operation with operating personnel. A continuous observation of the turning process by an individual who could better be employed elsewhere is therefore necessary and fully automatic operation is not possible.

OBJECTS OF THE INVENTION

It is, therefore, an important object of the present invention to provide a simple and economically fabricated tool which is especially effective for facing turning of a workpiece and can be used for combination turning in copying turning machines, e.g. so-called copying lathes, to yield a controlled chip breakage.

Another object of the invention is to provide a chip-removing tool or so-called turning plate with which the disadvantages of the aforedescribed systems are eliminated.

SUMMARY OF THE INVENTION

These objects and others which will become apparent hereinafter are attained, in accordance with the present invention, in a cutting tool, more specifically a turning tool or turning plate of a hard metal, e.g. tungsten carbide, for a turning machine such as a copying lathe or other apparatus adapted to carry out a facing operation (i.e. a turning operation in which the tool and workpiece are moved relatively transverse to the axis of rotation of the workpiece), in which the side of the cutting tool engaging the workpiece material for the chip removal operation is formed with a relatively long cutting edge and, adjoining this relatively long cutting edge, at least one auxiliary cutting edge which is shorter than the long cutting edge. More particularly, the relatively long cutting edge can include a greater angle with the direction of feed than the auxiliary or short cutting edge and, where two such main cutting edges are provided on the cutting side of the turning plate, each of them has adjoining it a relatively short auxiliary cutting edge.

The auxiliary cutting edge can include a definite angle, preferably an obtuse angle, with the respective main cutting edge although the junction between the auxiliary cutting edge and the main cutting edge can be radiused if desired.

According to a feature of the invention, the auxiliary curring edge is substantially perpendicular to the respective main cutting edge. While both cutting edges are preferably straight so that their junction forms a vertex, it is also possible to impart any desired shape to the auxiliary cutting edge, as long as the aforedescribed relationships are maintained so that, for example, the auxiliary cutting edge can be arcuate or curved.

The aforedescribed arrangement has the advantage that the auxiliary cutting edge produces a well-defined chip removal operation in addition to the main chip removal operation so that the chip removed by the simultaneous engagement of the main cutting edge and the auxiliary cutting edge adjoining same with the workpiece is characterized by two distinct parts which are separated from one another although attached in a single chip.

These parts include a narrow relatively thin part and a still smaller or narrower relatively thick part, the two parts adjoining at an angle. Investigations have shown that the thin part curls around the thick, narrower part in a worm pattern.

As a result of this cross-sectional difference in the two parts of the chip removed from the workpiece, and because of the worm-like twist of the chip, the latter tends to break at a maximum length of about 5 – 6 cm.

Because of such controlled breakage, a continuous monitoring of the operation of the copying machine by service personnel is superfluous. As a consequence, fully automatic operations can be carried out even with copier turning machines in which a significant portion of the machining operation is a facing operation.

The system of the present invention also has the advantage that it enables a simplified chip removal and chip transport away from the workpiece and a reduction of the chip vibration and shattering. The chips need not be broken up in a special manner for handling.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
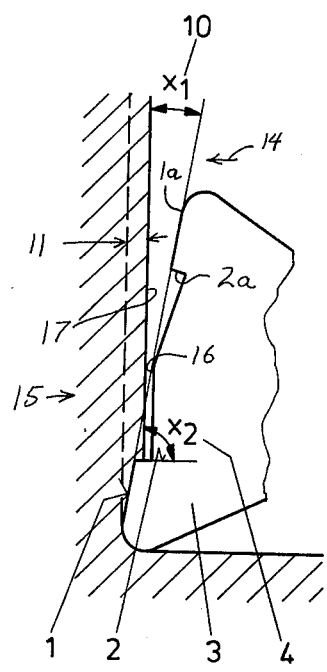
FIG. 1 is a diagrammatic view of a turning plate according to the invention in which the auxiliary cutting edge is rectilinear and angularly adjoins the respective main cutting edge.

In FIG. 1 of the drawing, there is illustrated a tool 3 according to the invention which is used to face a workpiece 13 by the removal of a chip therefrom with the direction of tool feed or material feed into the tool being shown at 14 or 15, respectively. The amount of the feed is indicated at 11 and the tool is here seen to have a pair of main cutting edges 1 and 1a which are inclined substantially to the direction of feed and auxiliary cutting edges 2 and 2a which form an obtuse angle with the respective cutting edges 1 and 1a, which angle may approach 90°. As can be seen in FIG. 1, the cutting edges 1, 1a and 2, 2a are disposed symmetrically on opposite sides of a shallow projection 16.

The main cutting edges are colinear and have an angle of attack $x_1$ with the workpiece face 17 from which the material is to be removed, this angle being a small acute angle. The angle of attack $x_2$ of the auxiliary cutting edge 2 is, however, substantially larger. These angles are designated at 10 and 4, respectively. The angle 10 may range between 2° and 30° while the angle 4 is preferably between 45° and 90°. The edges 2 and 2a flank a recess between the main edges 1, 1a.

Figure 2:
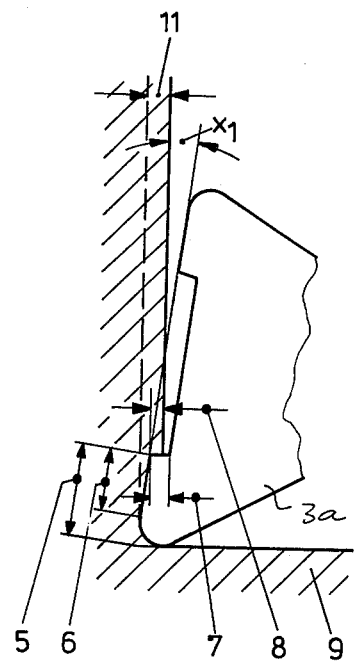
FIG. 2 is a view similar to FIG. 1 illustrating another embodiment of the invention.

In FIG. 2, there is shown a similar structure for a symmetrical tool 3a, the corresponding portions being designated with similar reference numerals. In the embodiments of FIGS. 1 and 2, the reference numeral 5 designates the length of the main cutting edge 1 while the length of the auxiliary or second cutting edge 2 is represented at 7. The lengths of the two angularly adjoining parts of the resulting chip are represented respectively at 6 and 8.

Figure 3:
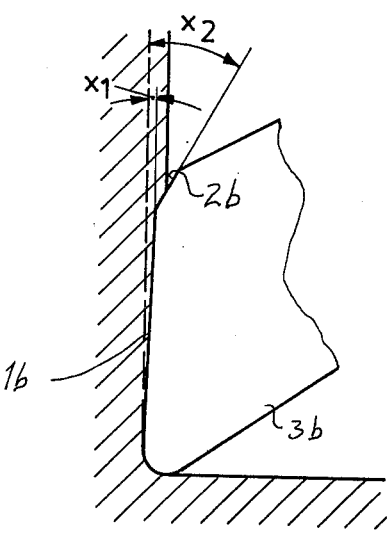
FIG. 3 is still another view showing a tool in which the cutting edges are disposed asymmetrically.

As can be been from FIG. 3, the tool 3b need not be symmetrical and can have a main cutting edge 1b which is considerably longer than the auxiliary cutting edge 2b. The latter can be formed at one corner of the turning plate.

Figure 4:
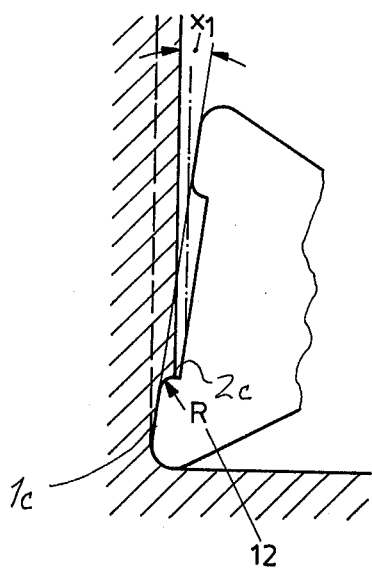
FIG. 4 is a view of a symmetrical turning plate according to the invention in which the junction between the auxiliary cutting edge and the main cutting edge is a radius.

FIG. 4 indicates that the auxiliary cutting edge 2c can be formed as a radius R represented at 12, at its junction with the main cutting edge 1c. While the depth of feed into the material is represented at 11 for facing, this length 7 of the second cutting edge can be less as has been indicated in dot-dash lines in FIG. 4.

The turning plate of the present invention can be used with advantage in all turning processes requiring a controlled chip breakage and is especially effective for fully automatic operations, especially copying turning, whereby a simplified chip transport and reduction of chip vibration is obtained.

While the ratio of the length of the long cutting edge to that of the short cutting edge can be selected as desired and for any particular requirements, it is preferred that this ratio range between 3:1 and 20:1. Best results are obtained with a ratio of 4:1 to 6:1.

I claim:

1. A turning plate, especially of hard metal for turning processes and particularly for copier turning, comprising a workpiece-engaging side having a pair of spaced-apart colinear relatively long main cutting edges defining a recess between them, and respective relatively short auxiliary cutting edges adjoining said main cutting edges and having a different angle of attack therefrom upon the workpiece, said short edges constituting flanks of said recess, said main cutting edges are at least several times as long as said auxiliary cutting edges.

2. The turning plate defined in claim 1 wherein said auxiliary cutting edge angularly adjoins said main cutting edge at a vertex.

3. The turning plate defined in claim 2 wherein said auxiliary cutting edge is substantially perpendicular to said main cutting edge.

4. The turning plate defined in claim 2 wherein said auxiliary cutting edge includes an obtuse angle with said main cutting edge.

5. The turning plate defined in claim 1 wherein said auxiliary cutting edge adjoins said main cutting edge in a radius.

* * * * *